(12) United States Patent
Yamaguchi et al.

(10) Patent No.: US 11,371,208 B2
(45) Date of Patent: Jun. 28, 2022

(54) WORK EQUIPMENT FOR MOTOR GRADER

(71) Applicant: Komatsu Ltd., Tokyo (JP)

(72) Inventors: Kota Yamaguchi, Tokyo (JP); Yuji Asai, Tokyo (JP); Toshihiro Yone, Tokyo (JP)

(73) Assignee: Komatsu Ltd., Tokyo (JP)

( * ) Notice: Subject to any disclaimer, the term of this patent is extended or adjusted under 35 U.S.C. 154(b) by 419 days.

(21) Appl. No.: 16/480,859

(22) PCT Filed: Apr. 25, 2018

(86) PCT No.: PCT/JP2018/016852
§ 371 (c)(1),
(2) Date: Jul. 25, 2019

(87) PCT Pub. No.: WO2019/207694
PCT Pub. Date: Oct. 31, 2019

(65) Prior Publication Data
US 2021/0355652 A1 Nov. 18, 2021

(51) Int. Cl.
*E02F 3/76* (2006.01)
*E02F 3/80* (2006.01)
*F16C 33/66* (2006.01)

(52) U.S. Cl.
CPC ............. *E02F 3/764* (2013.01); *E02F 3/80* (2013.01); *F16C 33/6659* (2013.01)

(58) Field of Classification Search
CPC . E02F 3/764; E02F 3/80; E02F 3/7627; E02F 3/7663; E02F 3/7668; E02F 3/7686; F16C 33/6659
See application file for complete search history.

(56) References Cited

U.S. PATENT DOCUMENTS

| 4,015,669 A | * | 4/1977 | Cole | E02F 3/764 172/796 |
| 4,122,903 A | * | 10/1978 | Cole | E02F 3/764 172/747 |
| 4,185,700 A | * | 1/1980 | Atherton | E02F 3/764 172/796 |
| 2005/0034879 A1 | | 2/2005 | McGugan | |
| 2007/0068735 A1 | | 3/2007 | Mori et al. | |
| 2015/0135866 A1 | * | 5/2015 | Staade | F16H 57/029 74/89.18 |
| 2016/0024750 A1 | | 1/2016 | Yoshimura et al. | |

(Continued)

FOREIGN PATENT DOCUMENTS

| CN | 1871465 A | 11/2006 |
| CN | 104947731 A | 9/2015 |

(Continued)

*Primary Examiner* — Jamie L McGowan
(74) *Attorney, Agent, or Firm* — Locke Lord LLP

(57) ABSTRACT

The work equipment for a motor grader includes: a rotary machine main body for rotating an outer gear engaging with an inner gear provided on an inner peripheral surface of an inner ring of a bearing; and a rotary machine lubrication unit provided on a gear cover in a circle rotary machine and for supplying a lubricant to a space, wherein the gear cover is provided in the rotary machine main body, covers the outer gear from the outer peripheral side thereof, forms the space between the outer gear and the gear cover, and is fixed to a drawbar plate.

3 Claims, 6 Drawing Sheets

(56) References Cited

U.S. PATENT DOCUMENTS

| | | | |
|---|---|---|---|
| 2021/0140514 A1* | 5/2021 | Smemo | E02F 3/7645 |
| 2021/0180289 A1* | 6/2021 | Gundupalli | E02F 3/8157 |
| 2021/0285453 A1* | 9/2021 | Sishtla | F16C 32/0442 |

FOREIGN PATENT DOCUMENTS

| | | |
|---|---|---|
| CN | 107574850 A | 1/2018 |
| EP | 3040553 A1 | 7/2016 |
| JP | 2012-163215 A | 8/2012 |
| JP | 2016-125587 A | 7/2016 |
| WO | 2014/203309 A1 | 12/2014 |

* cited by examiner

WORK EQUIPMENT FOR MOTOR GRADER

TECHNICAL FIELD

The present invention relates to a work equipment for a motor grader.

BACKGROUND TECHNOLOGY

Patent Document 1 discloses a motor grader. The motor grader is provided with a work equipment. The work equipment has a circle that supports a blade. The circle supports the blade and is rotatably supported by the drawbar. The circle is capable of being rotated by a rotary machine by engaging an outer gear (pinion) provided in the rotary machine such as a motor with an inner gear provided on an inner peripheral surface of the circle. The blade are also rotated by the rotation of the circle.

PRIOR ART DOCUMENT

Patent Document

Patent Document 1: WO 2014/203309.

SUMMARY OF THE INVENTION

Problems to be Solved by the Invention

In order to suppress seizure and wear of an engagement portion between the outer gear of the rotary machine and the inner gear of the circle, periodic lubricant supply (grease feeding) is required. However, in a case where a work equipment has a structure that is necessary to apply directly a lubricant to the engagement portion by an operator, there is a problem such as a bad workability, a tight posture of the operator during the operation, and consuming time for the work itself.

The present invention is taken into consideration in view of the above problem, and the object of the present invention is to provide a work equipment for a motor grader that is capable of improving maintenance performance and securing durability. In other words, the present invention provides a work equipment for a motor grader that is capable of easily supplying a lubricant to an engagement portion between an outer gear of a rotary machine and an inner gear of a circle, and enabling smooth movement of the circle.

Means for Solving the Problem

An aspect of the present invention provides a work equipment for a motor grader comprising: a drawbar having a drawbar plate extending along a horizontal surface; a bearing having an outer ring that has an annular shape when seen from a plan view and is fixed to a lower surface of the drawbar plate, and an inner ring that has an annular shape when seen from a plan view, is disposed inside the outer ring, is connected to the outer ring so as to be rotatable in a peripheral direction with respect to the outer ring, and is provided with an inner gear in an inner peripheral surface of the inner ring; a circle rotary machine having a rotary machine main body that is provided with an outer gear engaging with the inner gear and that is configured to rotate the outer gear, and a gear cover that is provided on the rotary machine main body and covers the outer gear from the outer peripheral side of the outer gear, forms a space between the outer gear and the gear cover, and is fixed to the drawbar plate; a rotary machine lubrication unit provided on the gear cover and configured to supply a lubricant to the space; and a circle fixed to a lower end of the inner ring over the peripheral direction and communicating with the space to form an opening portion below the space.

The work equipment for the motor grader is provided with a rotary machine lubricating unit that is capable of supplying a lubricant to a space between a rotary machine main body and a gear cover of a circle rotary machine. Therefore, the operator can supply a lubricant to the engagement portion without directly accessing the engagement portion between the inner gear and the outer gear to supply the lubricant thereto. Further, the lubricant supplied to the space between the outer gear and the gear cover spreads the entire periphery of the outer gear as the outer gear rotates, and then is discharged from the space between the outer gear and the gear cover through an opening portion formed by the circle. Accordingly, a new lubricant can be supplied to the space while discharging the old lubricant, thereby it is possible to improve the lubricating performance of the engagement portion between the inner gear and the outer gear. Further, since the gear cover covering the outer gear is provided, it is possible to prevent the dirt from directly entering into the outer gear, and it is possible to suppress the wear of the engagement portion.

Effect of Invention

According to the work equipment for the motor grader of the above embodiment, it is possible to provide a work equipment for a motor grader that is capable of improving maintenance performance and securing durability. In other words, the present invention is capable of easily supplying a lubricant to an engagement portion between an outer gear of a rotary machine and an inner gear of a circle, and enabling smooth movement of the circle.

MODE FOR CARRYING OUT THE INVENTION

An embodiment of the present invention will be described in detail below with reference to FIGS. 1 to 8.

«Motor Grader»

Figure 1:
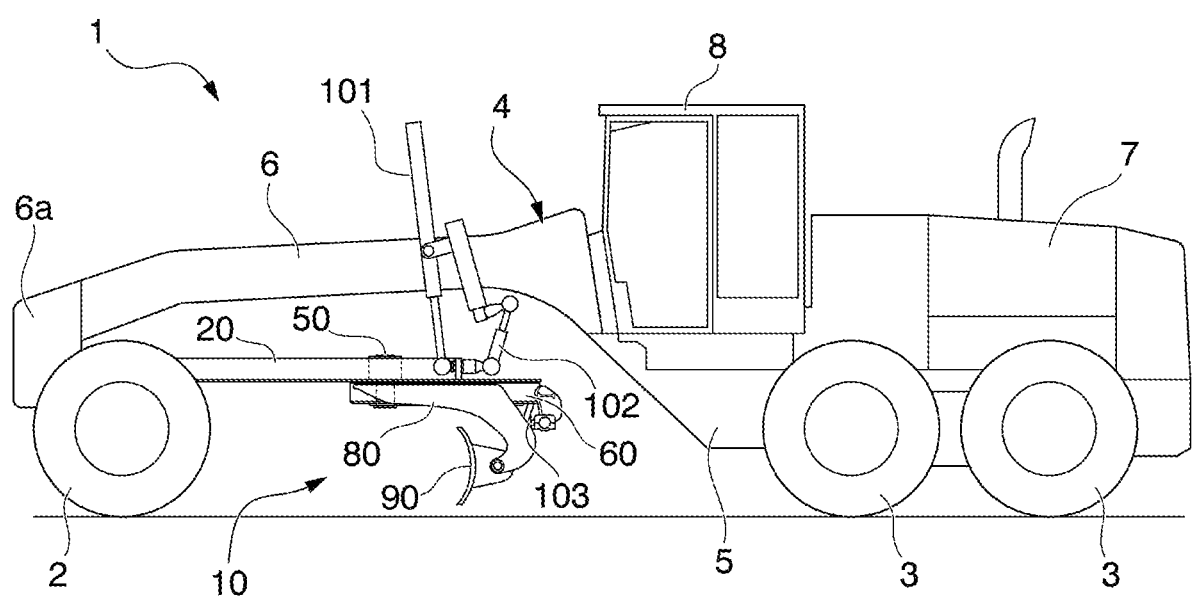
FIG. 1 is a side view of a motor grader according to an embodiment of the present invention.

As shown in FIG. 1, a motor grader 1 of the embodiment is mainly provided with a traveling wheels 2, 3, a vehicle body frame 4, a cab 8, and a work equipment 10. The work equipment 10 has a blade 90. The motor grader 1 performs works such as a ground leveling work, a snow removal work, a light cutting work, material mixing work, or the like, by the blade 90. The motor grader 1 has front wheels 2 and rear wheels 3 as traveling wheels 2, 3. The motor grader 1 of the present embodiment has two front wheels 2, each one of which is provided on both side, and four rear wheels 3, each two of which are provided on both side.

In the following description, forward-rearward directions refers to forward-rearward directions of the motor grader 1. That is, the "forward-rearward directions" means the forward-rearward directions as viewed from the driver seated on the driver's seat of the cab 8. A "vehicle width direction" means a vehicle width direction of the motor grader 1. That is, the vehicle width direction means left and right directions as viewed from the driver seated on the driver's seat of the cab 8.

The vehicle body frame 4 includes a rear frame 5, a front frame 6, and an exterior cover 7. The rear franc 5 supports components (not shown) such as an exterior cover 7 and an engine disposed in an engine chamber. The exterior cover 7 covers the engine chamber at a rear of the cab 8. In the rear frame 5, each of the four rear wheels 3 is attached so as to be capable of being rotationally driven by driving force from the engine. The front frame 6 is attached to a front of the rear frame 5. A counterweight 6a is attached to a front end of the front frame 6. At a lower portion of the front end of the front frame, the two front wheels 2 are rotatably attached.

The cab 8 is placed on a front portion of the rear frame 5. In an inside portion of the cab 8, an operating unit (not shown) such as a steering wheel, a shift lever, an operation lever for the work equipment 10, a brake, an accelerator pedal, an inching reel, and the like, are provided.

«Work Equipment»

Figure 2:
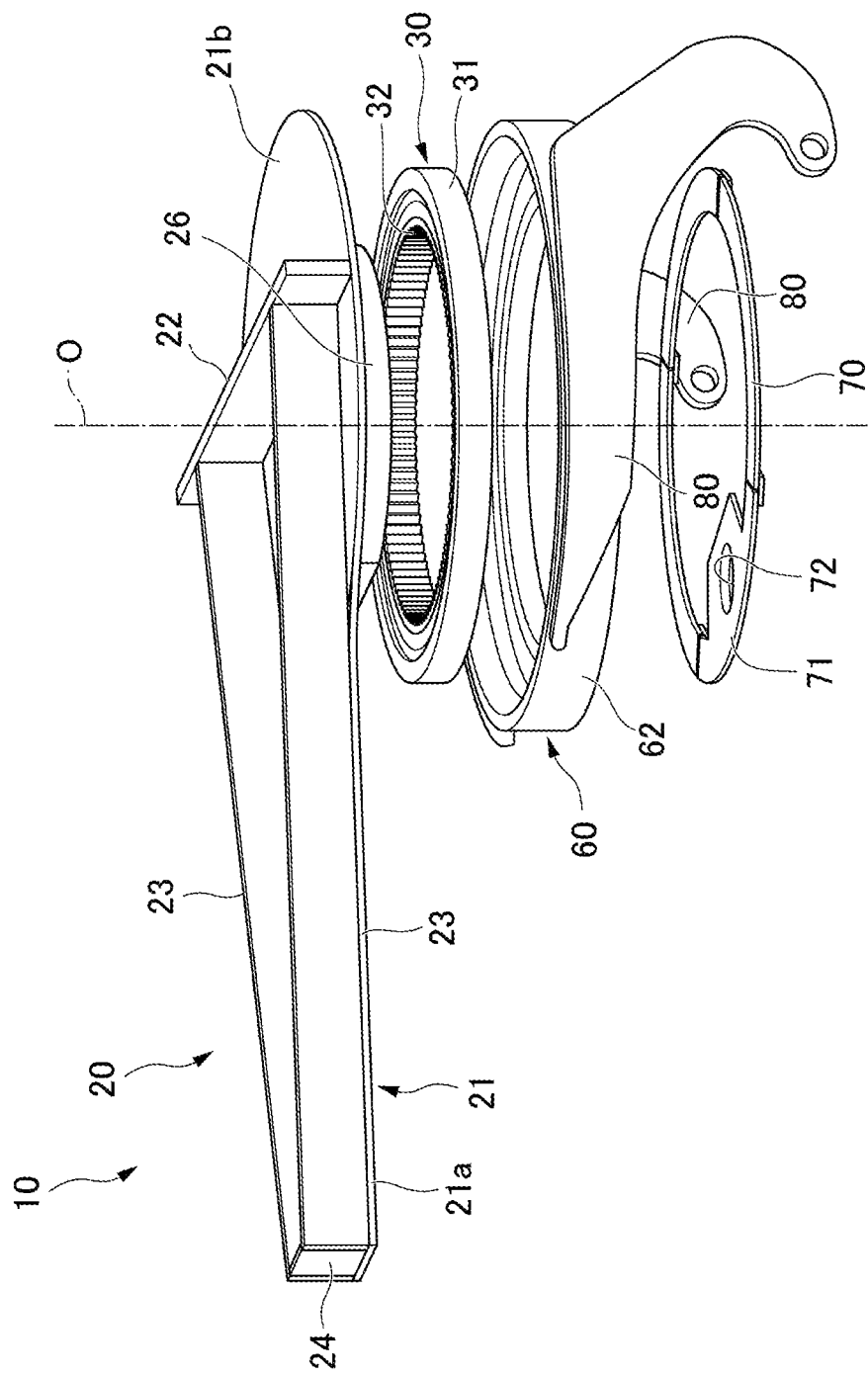
FIG. 2 is an exploded perspective view of the drawbar, a bearing, a circle, a support, and a bottom cover of the work equipment for the motor grader according to the embodiment of the present invention.
Figure 3:
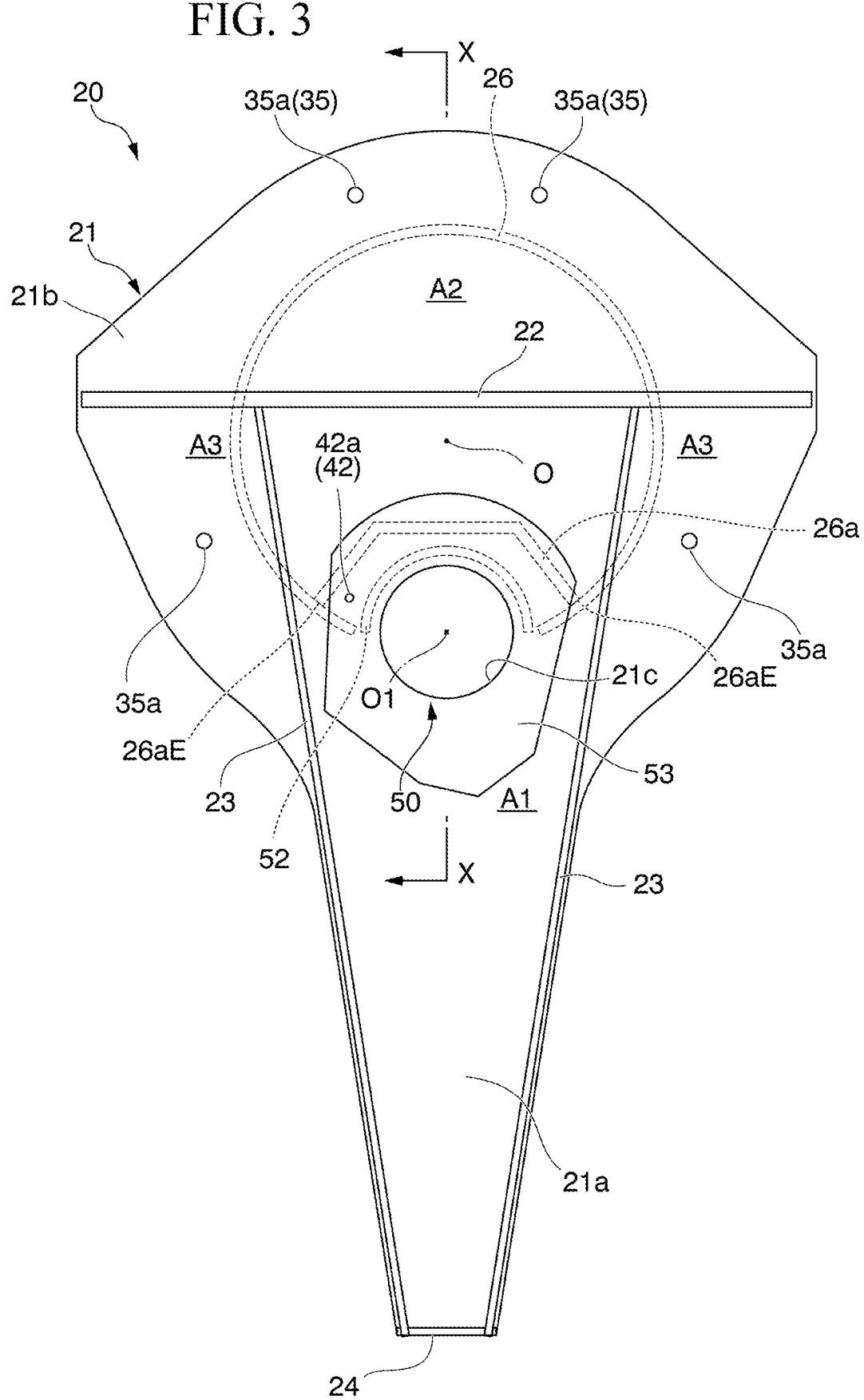
FIG. 3 is a plan view of the work equipment for the motor grader according to the embodiment of the present invention as seen from above.
Figure 4:
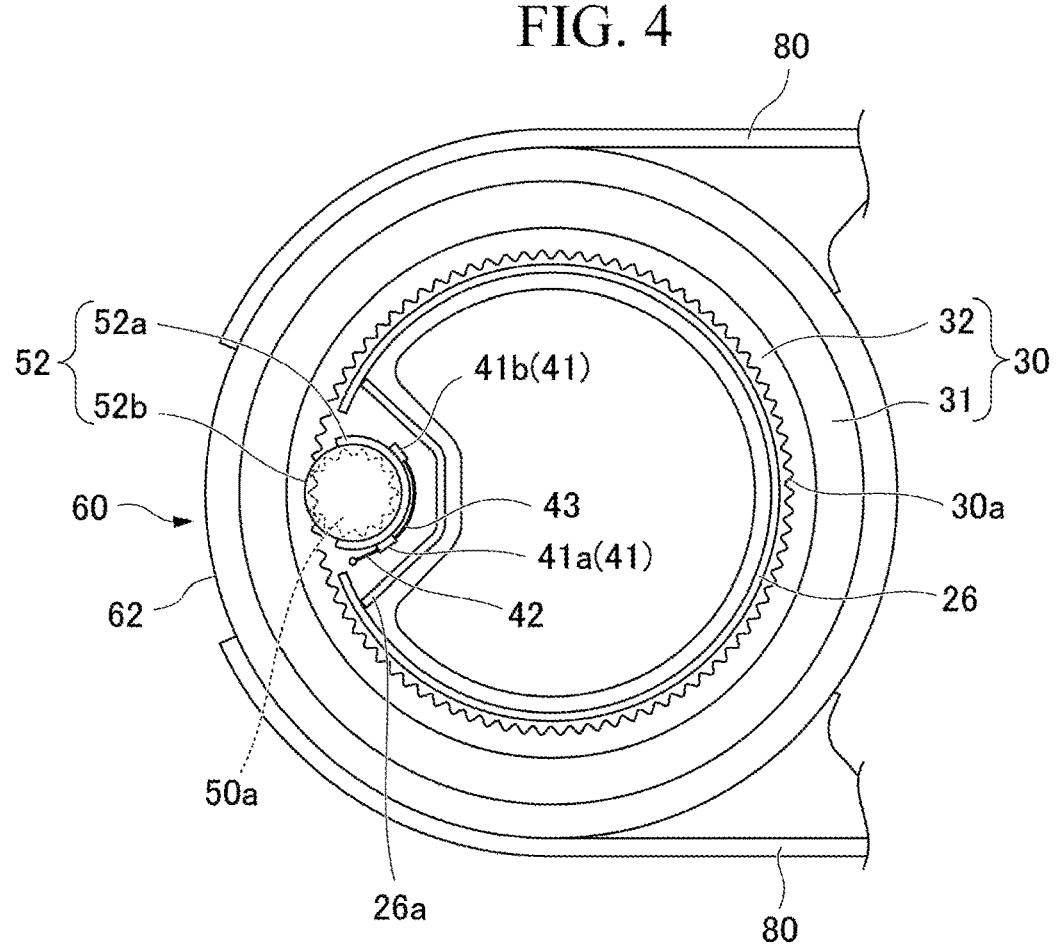
FIG. 4 is a plan view of the work equipment for the motor grader according to the embodiment of the present invention as seen from below, and shows a state in which the bottom cover is removed.

The work equipment 10 includes, in addition to the blade 90, as shown in FIGS. 2 to 4, a drawbar 20, a bearing 30 provided with an inner gear 30a, a circle rotary machine 50 provided with an outer gear 50a, a circle 60, a rotary machine lubricating unit 40 for supplying the lubricant L to the outer gear 50a, and a bottom cover 70.

«Drawbar»

As shown in FIGS. 2 to 5, the drawbar 20 includes a drawbar plate 21, a lateral rib 22, a vertical rib 23, a curved rib 26, and a curved rib recessed portion 26a.

«Drawbar Plate»

The drawbar plate 21 has a plate shape extending along a horizontal surface. An upper surface and a lower surface of the drawbar plate 21 has a planar shape extending along the horizontal surface. The drawbar plate 21 extends in the forward-rearward directions as a longitudinal direction. A portion on the forward side of the drawbar plate 21 is a plate front portion 21a which tapers in a forward side when seen from a plan view. A portion of the drawbar plate 21 on the rearward side is a plate rear portion 21b which is made larger in the vehicle width direction than the plate front portion 21a. The plate rear portion 21b has a shape in which, after a size in the vehicle width direction becomes gradually larger toward the rearward side from the rear end of the plate front portion 21a, a distance in the vehicle width direction becomes smaller toward the rear.

«Lateral Rib»

The lateral rib 22 has a plate shape protruding from an upper surface of the plate rear portion 21b in the drawbar plate 21 and extending in the vehicle width direction. The lateral rib 22 is provided at a position of the forward-rearward directions at which the vehicle width direction in the plate rear portion 21b is maximized.

«Vertical Rib»

The vertical rib 23 protrudes from the drawbar plate 21 and has a plate shape extending in the forward-rearward directions over the plate front portion 21a and the plate rear portion 21b of the drawbar plate 21. A pair of the vertical ribs 23 is provided at a distance from each other in the vehicle width direction. A rear end of each vertical rib 23 is connected to a front surface of the lateral rib 22. A position in the forward-rearward directions of the distal end of each vertical rib 23 coincides with the distal end of the plate front portion 21a. The pair of vertical ribs 23 is provided so that a distance in the vehicle width direction of the pair of vertical ribs 23 becomes smaller toward the forward side. A portion on the plate front portion 21a in the pair of vertical ribs 23 extends so as to coincide with a side edge portion of the plate front portion 21a in the vehicle width direction when seen from a plan view.

In a region on the drawbar plate 21, a front portion and a central portion sectioned by the pair of vertical ribs 23 and the lateral rib 22 are defined as a front portion region A1. A through hole 21c is formed in the front portion region A1 so as to penetrate the drawbar plate 21 in the vertical direction. The through hole 21c is formed at a position near the center in the vehicle width direction.

In the region on the drawbar plate 21, a portion on the rearward side of the lateral rib 22 is defined as a rear portion area A2. In the region on the drawbar plate 21, a portion between a surface facing the outer side in the vehicle width direction of each vertical rib 23 and a front surface of the lateral rib 22 is defined as a side portion region A3. A pair of side portion regions A3 is formed at a distance from each other in the vehicle width direction.

A connecting portion 24 is provided between the front end of the pair of vertical ribs 23 and the front end of the drawbar plate 21. A sliding member (not shown) is connected to the connecting portion 24. The sliding member is connected to the front frame 6. The drawbar 20 is connected to each hydraulic cylinder, as will be described later. The drawbar 20 is swingable with respect to the front frame 6 in accordance with the expansion and contraction of each hydraulic cylinder.

«Curved Rib»

Figure 5:
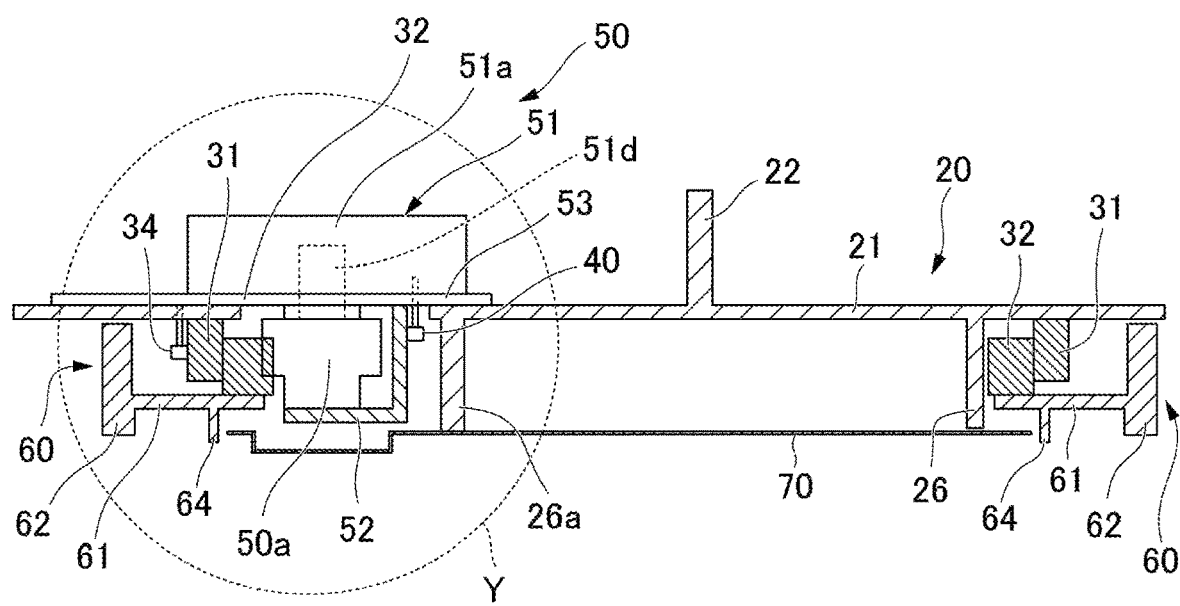
FIG. 5 is a vertical sectional view of the work equipment for the motor grader according to the embodiment of the present invention, and shows the X-X cross section in FIG. 3.

As shown in FIGS. 3 to 5, the curved rib 26 is provided so as to protrude downward from the lower surface of the plate rear portion 21b in the drawbar plate 21. The curved rib 26 has a plate shape which extends so as to be curved in a peripheral direction of an imaginary circle (hereinafter referred to simply as a peripheral direction) centered on an axis O extending in the vertical direction. The axis O is located in a center portion of the plate rear portion 21b. The curved rib 26 has a plate shape in which a radial direction of an imaginary circle (hereinafter referred to simply as a radial direction) centered on the axis O is a plate thickness direction. The most part of the curved rib 26 except for a forward part of the curved rib 26 of the present embodiment extends in an annular shape centered on the axis O when seen from a plan view.

The forward part of the curved rib 26 (curved rib recessed portion 26a) extends so as to be recessed rearward so as to avoid the through hole 21c when seen from a plan view. The curved rib recessed portion 26a is disposed so as to cover an outer periphery of a lateral surface portion 52a of the gear cover 52. An end portion 26aE of the curved rib recessed portion 26a and the curved rib 26 are connected to each other by welding. A protruding length of the curved rib 26, i.e., the size in the vertical direction of the curved rib 26, is constant over the peripheral direction. A protruding length and a plate thickness of the curved rib recessed portion 26a are equivalent to those of the curved rib 26.

As shown in FIG. 3, the curved rib 26 extends so as to pass through the front portion region A1, the rear portion region A2 and the side portion region A3 in the upper surface of the drawbar 20 when seen from a plan view. That is, the curved rib 26 overlaps with the lateral rib 22 and the pair of vertical ribs 23 when seen from a plan view and extends across the lateral rib 22 and the pair of vertical ribs 23. Also, the curved rib recessed portion 26a is disposed within the front portion region A1.

As shown in FIG. 1, the drawbar 20 is connected to the front frame 6 by a pair of left and right lift cylinders 101 and a drawbar shift cylinder 102. By the pair of lift cylinders 101, the drawbar 20 is capable of being lifted and lowered and being swung around an axis along the forward-rearward directions. The drawbar shift cylinder 102 allows the drawbar 20 to be moved in left and right directions relative to the front frame 6.

«Bearing»

As shown in FIGS. 2, 4 and 5, the bearing 30 is a member having an annular shape centered on the axis O, and is provided in a space between the drawbar 20 and the circle 60 below the drawbar 20. As shown in FIG. 5, the bearing 30 is provided between the outer peripheral-side wall portion 62 which is provided in an end portion on the outer peripheral side below the drawbar 20 and the curved rib 26 so as to be sandwiched between the outer peripheral-side wall portion 62 and the curved rib 26, in the peripheral direction other than a position where the circle rotary machine 50 is installed. The bearing 30 includes an outer ring 31, an inner ring 32, and a rolling body 33.

«Outer Ring»

Figure 6:
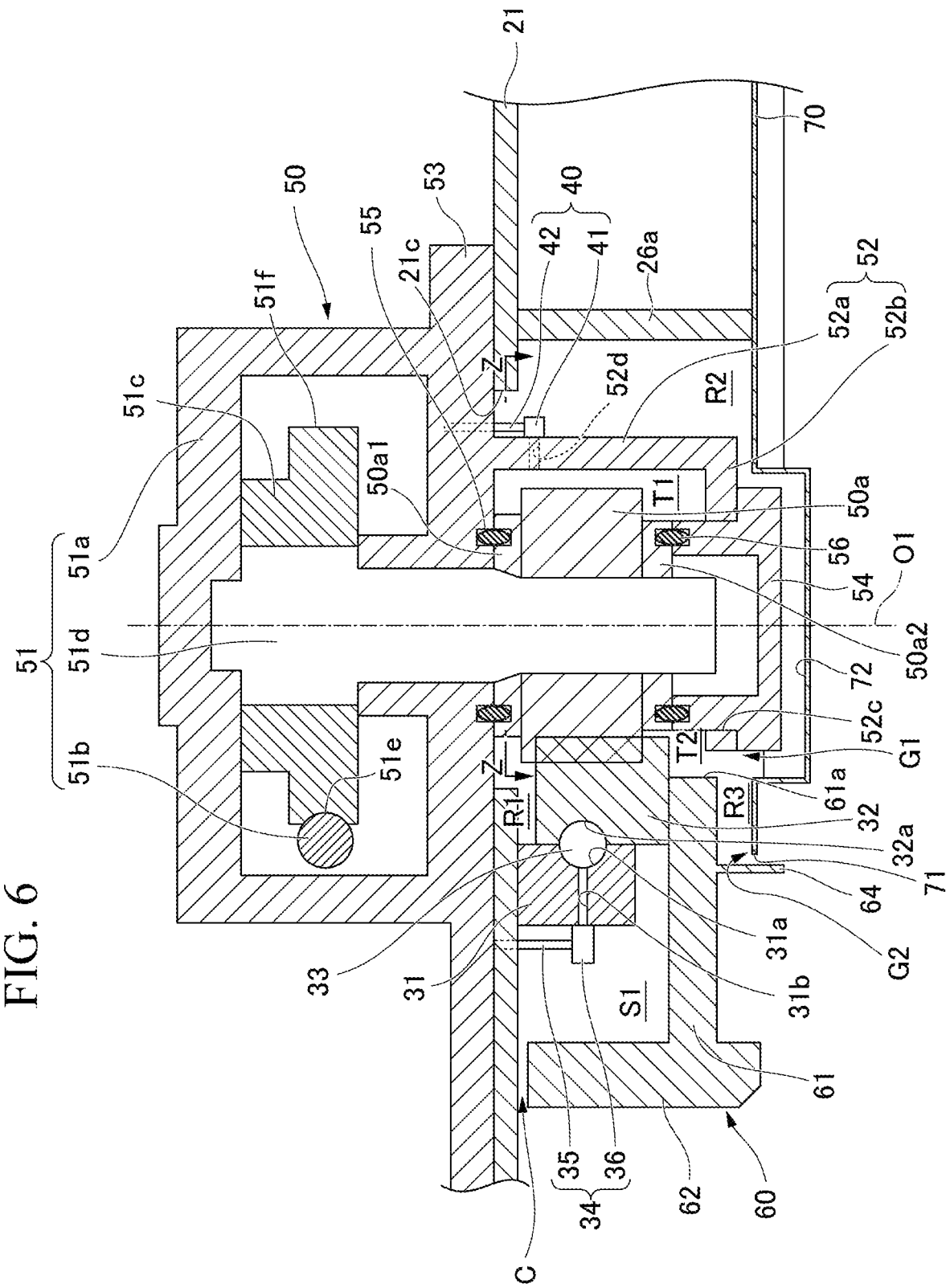
FIG. 6 is a vertical sectional view of the work equipment for the motor grader according to the embodiment of the present invention, and is an enlarged view of the Y portion in FIG. 5.

The outer ring 31 is a member having an annular shape centered on the axis O when seen from a plan view. As shown in FIGS. 5 and 6, the outer ring 31 has a rectangular shape in a cross section orthogonal to the peripheral direction. An upper-end surface of the outer ring 31 has a flat shape along a horizontal surface. The upper-end surface of the outer ring 31 is fixed to a lower surface of the plate rear portion 20b in the drawbar 21 over the peripheral direction. The outer ring 31 is fixed to the draw bus plate 21 by a plurality of bolt (not shown) arranged in a peripheral direction so as to pass through the drawbar plate 21 vertically and is integrated with the drawbar plate 21. A lower-end surface of the outer ring 31 has a flat shape along a horizontal surface. The lower-end surface of the outer ring 31 is located lower than the upper-end surface of the outer peripheral-side wall portion 62.

An inner peripheral surface and an outer peripheral surface of the outer ring 31 have a cylindrical shape which is parallel to the axis O. In the inner peripheral surface of the outer ring 31, an outer ring recessed groove 31a recessed from the inner peripheral surface and extending over the peripheral direction is formed. In the outer ring 31, a plurality of supply holes 31b penetrating the inner peripheral surface and the outer peripheral surface of the outer ring 31 in the radial direction are formed at a distance from each other in the peripheral direction. The supply hole 31b communicates with the outer ring recessed groove 31a.

The outer peripheral surface of the outer ring 31 faces the inner peripheral surface of the outer peripheral-side wall portion 62 of the circle 60 at a distance inside in the radial direction from the inner peripheral surface of the outer peripheral-side wall portion 62 of the circle 60. As a result, an outer peripheral-side space S1 is formed between the outer peripheral surface of the outer ring 31 and the inner peripheral surface of the outer peripheral-side wall portion 62.

«Inner Ring»

As shown in FIGS. 5 and 6, the inner ring 32 is a member having an annular shape centered on the axis O when seen from a plan view. The inner ring 32 has a diameter smaller than that of the outer ring 31, and is disposed inside of the outer ring 31 in the radial direction. As shown in FIGS. 5 and 6, the inner ring 32 has a rectangular shape in a cross section orthogonal to the peripheral direction. An upper-end surface of the inner ring 32 is located one step lower than the upper-end surface of the outer ring 31. Thus, the portion space R1 is formed between the upper-end surface of the inner ring 32 and the lower surface of the drawbar plate 21. A lower-end surface of the inner ring 32 is located one step lower than the lower-end surface of the outer ring 31.

The outer peripheral surface of the inner ring 32 has a cylindrical shape centered on the axis O. The outer peripheral surface of the inner ring 32 is disposed with a slight clearance with respect to the inner peripheral surface of the outer ring 31. An inner ring recessed groove 32a recessed inside in the radial direction from the outer peripheral surface and extending over the peripheral direction is formed on the outer peripheral surface of the inner ring 32. A position in the vertical direction of the inner ring recessed groove 32a corresponds to the position in the vertical direction of the outer ring recessed groove 31a.

In a portion on an inner peripheral side of the inner ring 32, an inner gear 30a having a continuous uneven in a peripheral direction is provided over the peripheral direction and the vertical direction so as to form an annular shape centered the axis O.

«Inner Gear»

The inner gear 30a is integrally provided on the inner ring 32 so as to protrude inward in the radial direction from the inner peripheral surface of the inner ring 32. The inner gear 30a is disposed at a distance in the radial direction from the outer peripheral surface of the curved rib recessed portion 20a of the drawbar 26. A space between the inner gear 30a and the curved rib recessed portion 26a is an inner peripheral-side space R2 extending in the vertical direction and the peripheral direction. The upper end of the inner peripheral-side space R2 and the upper portion space R1 communicate with each other.

«Rolling Body»

The rolling body 33 is provided between the outer ring 31 and the inner ring 32, and the outer ring 31 and the inner ring 32 are brought into sliding contact with each other so that the outer ring 31 and the inner ring 32 is capable of being relatively rotated to each other in the peripheral direction. The rolling body 33 of the present embodiment is a ball having a spherical shape. A plurality of rolling bodies 33 are accommodated over the peripheral direction in an accommodating space formed by being sectioned by the outer ring recessed groove 31a and the inner ring recessed groove 32a. As the rolling body 33, a rod-shaped roller may be used. In this case, a plurality of rollers are arranged over the peripheral direction with a center axis of each roller directing toward the vertical direction.

As shown in FIG. 6, a bearing lubrication unit 34 for supplying lubricant L between outer ring 31 and inner ring 32 is provided in bearing 30. The bearing lubrication unit 34 has a penetration pipe 35 and a connection portion 36. The penetration pipe 35 is a pipe extending in the vertical direction. The penetration pipe 35 penetrates through the drawbar plate 21 and opens above the drawbar plate 21. A lower portion of the penetration pipe 35 is located within the outer peripheral-side space S1. The lubricant L (grease) is pumped from the opening portion 35a (see FIG. 3) of the penetration pipe 35 provided above the drawbar plate 21, whereby the lubricant L is supplied to the bearing 30.

A plurality of connection portions 36 are provided in the outer peripheral-side space S1, and are attached to the opening portions of the respective supply holes 31b in the outer peripheral surface of the outer ring 31. A lower end of the penetration pipe 35 is connected to the connection portion 36. The connection portion 36 connects the penetration pipe 35 and the supply hole 31b so as to communicate with each other. Thus, the lubricant L introduced through the opening portion of the penetration pipe 35 is supplied to the supply hole 31b through the penetration pipe 35 and the connection portion 36.

«Circle Rotary Machine»

As shown in FIGS. 2 and 3, the circle rotary machine 50 is provided so as to vertically penetrate through the through hole 21c of the drawbar plate 21. The circle rotary machine 50 includes a rotary machine main body 51, a gear cover 52, and a flange portion 53.

«Rotary Machine Main Body»

As shown in FIG. 6, the rotating machine main body 51 includes a housing 51a, a worm 51b, a worm wheel 51c, and a shaft 51d.

The housing 51a accommodates the worm 51b and the worm wheel 51c. The worm 51b is a cylindrical member which is arranged along the horizontal direction. The worm 51b is rotated by means of a hydraulic device (not shown). Screw teeth 51c are formed on an outer peripheral surface of the worm 51b.

The worm wheel 51c has a cylindrical shape and is disposed above the drawbar plate 21. The worm wheel 51c is rotatable about an axis O1 extending in the vertical direction. On an outer peripheral surface of the worm wheel 51c, a teeth portion 51f that engages with the screw teeth 51e of the worm 51b is formed. The worm wheel 51c is rotated by the rotation of the worm 51b.

The shaft 51d has a cylindrical shape and is disposed so as to penetrate the drawbar plate 21 in the vertical direction. The shaft 51d is inserted into the worm wheel 51c and integrated with the worm wheel 51c. The shaft 51d is supported by the housing 51a so as to be rotatable together with the worm wheel 51c so as to be centered on the axis O1. The outer gear 50a is provided in the lower portion of the shaft 51d.

«Outer Gear»

The outer gear 50a is a pinion gear, and is disposed below the drawbar plate 21. The shaft 51d is inserted into the outer gear 50a and integrated with the outer gear 50a. The outer gear 50a is rotatable with respect to the shaft 51d and the worm wheel 51c so as to be centered on the axis O1. An upper protruding portion 50a1 having a cylindrical shape and having an outer diameter smaller than that of the outer gear 50a is provided integrally with the outer gear 50a on an upper surface of the outer gear 50a. The upper surface of the upper protruding portion 50a1 is arranged so as to face a lower surface of the housing 51a, and an O-ring 55 is provided between the upper surface of the upper protruding portion 50a1 and the lower surface of the housing 51a. A lower protruding portion 50a2 having an outer diameter similar to that of the upper protruding portion 50a1 is provided integrally with the outer gear 50a on the lower surface of the outer gear 50a.

«Gear Cover»

As shown in FIGS. 5 and 6, the gear cover 52 is provided integrally with the housing 51a. The gear cover 52 includes a lateral surface portion 52a, and a lower surface portion 52b integrally formed with the lateral surface portion 52a.

The lateral surface portion 52a covers part of the outer gear from the outer peripheral side thereof other than a position in the outer gear 50a where the outer gear 50a and the inner gear 30a are engaged with each other. The lateral surface portion 52a is disposed away from the outer gear 50a in the radial direction of an imaginary circle centered on the axis O1, covers the outer gear 50a from the outer peripheral side thereof, and forms a space T1 between the outer gear 50a and the lateral surface portion 52a. As shown in FIG. 4, the lateral surface portion 52a has a shape such that the annular member centered on the axis O1 is partially cut away when the outer gear 50a is viewed from the direction of the axis O1.

The lower surface portion 52b has a disc shape centered on the axis O1 and is provided integrally with the lateral surface portion 52a at a lower end of the lateral surface portion 52a. The lower surface portion 52b is disposed away from the outer gear 50a in the direction of the axis O1 and covers the outer gear 50a from below so as to form a space T2 between the outer gear 50a and the lower surface portion 52b. As shown in FIG. 6, part of the lower surface portion 52b is disposed below the inner ring 32. That is, part of the lower surface portion 52b is protruded from the lateral surface portion 52a to the inner ring 32 side when seen from a plan view. The lower surface portion 52b is provided with a through hole 52c that passes through in the vertical direction. A cover member 54 is inserted into the through hole 52c from below, and is fixed to the lower surface portion 52b by a bolt (not shown). An upper surface of the cover member 54 is disposed so as to face the lower surface of the lower protruding portion 50a2 integrally provided with the outer gear 50a. An O-ring 56 is provided between the upper surface of the cover member 54 and the lower surface of the lower protruding portion 50a2.

«Flange Portion»

Figure 8:
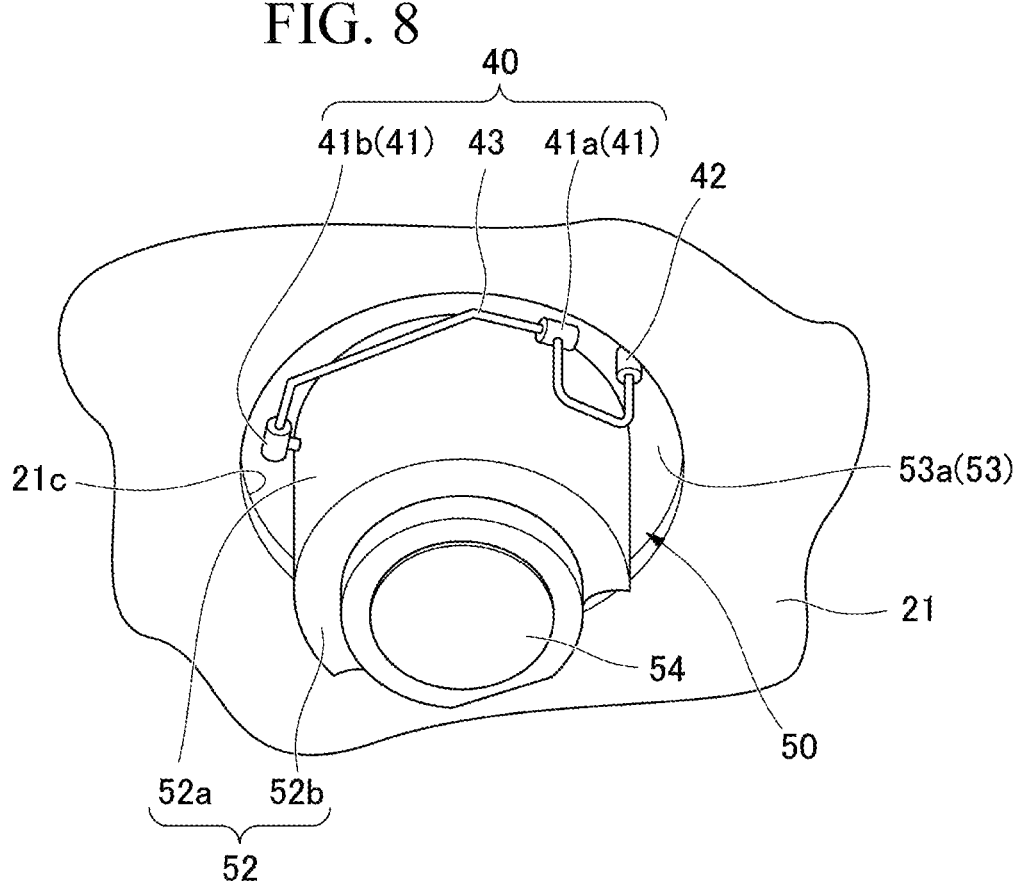
FIG. 8 is a perspective view of a portion including the gear cover of the rotary machine of the work equipment for the motor grader according to the embodiment of the present invention as viewed from below obliquely.

As shown in FIGS. 5 and 6, the flange portion 53 protrudes from an upper end of the gear cover 52 to an outside in the radial direction of the imaginary circle centered on the axis O1, that is, to an outside of the outer gear 50a in the radial direction. The flange portion 53 is fixed in a state in which the circle rotary machine 50 is inserted into the through hole 21c of the drawbar plate 21 and in a state in which the circle rotary machine 50 is in contact with the upper surface of the drawbar plate 21. As shown in FIGS. 6 and 8, part of the lower surface of the flange portion 53 is exposed downward from the through hole 21c. The part where the flange portion 53 is exposed downward from the through hole 21c is an exposed portion 53a. The flange portion 53 is capable of being inserted into and removed from the through hole 21c together with the gear cover 52 and the housing 51a.

«Rotary Machine Lubrication Unit»

Figure 7:
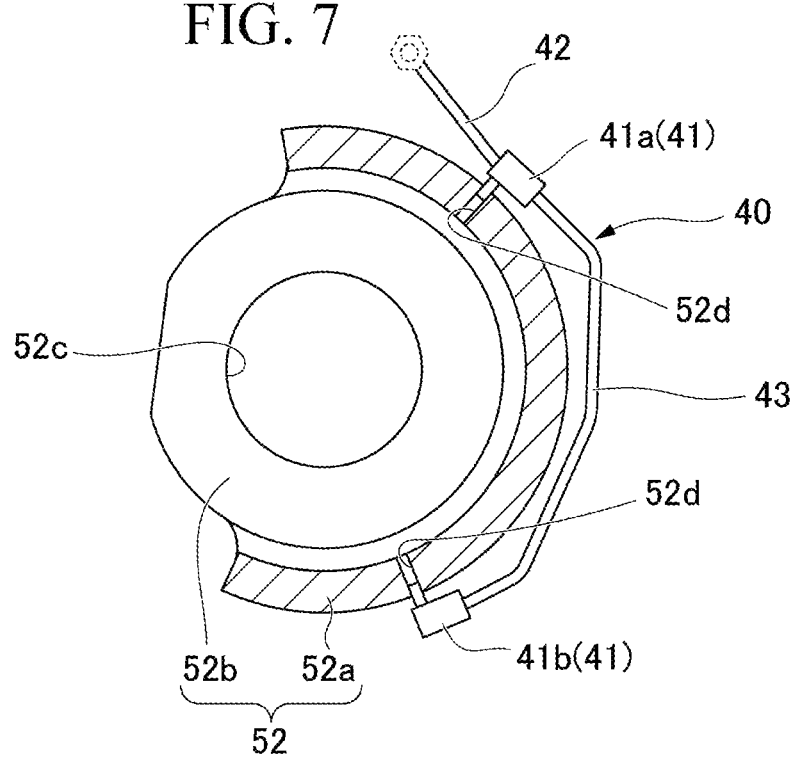
FIG. 7 is a plan view of a portion including a gear cover of a circle rotary machine in the work equipment for the motor grader according to the embodiment of the present invention, and is a view from a direction of an arrow Z in FIG. 6.

As shown in FIG. 6, FIG. 7 and FIG. 8, the rotary machine lubricating unit 40 includes a plurality of supply portions 41 (41a and 41b), a single introduction portion 42, and a connection member 43. The supply portion 41 is provided in an inner peripheral-side space R2 between the lateral surface portion 52a and the curved rib recessed portion 26a. The supply portions 41 are provided in a peripheral direction of the outer gear 50a, that is, a plurality of portions (two portions in the present embodiment) provided at intervals in the peripheral direction of the lateral surface portion 52a of the gear cover 52. Each supply portion 41 is provided at a position close to the upper end of the lateral surface portion 52a and at the same position in the vertical direction. Each supply portion 41 is provided in a supply hole 52d which penetrates through the lateral surface portion 52a of the gear cover 52 in the radial direction of the outer gear 50a, and opens toward the space T1. The lubricant (grease) L is pumped to the space T1 from the supply portion 41 to be supplied thereto (greasing).

The connection member 43 is a tubular member to which the plurality of supply portions 41a and 41b are connected to each other, and through which the lubricant L flows. The connection member 43 extends and curves in the peripheral direction of the lateral surface portion 52a of the gear cover 52 along the lateral surface portion 52a so as to be separated from the lateral surface portion 52a.

As shown in FIG. 8, the introduction portion 42 is a U-shaped tubular member which is connected to only one supply portion 41a, extends downward from the supply portion 41a, penetrates through the exposed portion 53a of the flange portion 53, and opens above the flange portion 53, i.e., above the drawbar plate 21. The lubricant L is introduced into the introduction portion 42 from an opening portion 42a (see FIG. 3) of the upper surface of the drawbar plate 21. The lubricant L introduced from the opening portion 42a is supplied to the space T1 through the introduction portion 42, the supply portion 41, and the connection member 43.

«Circle»

As shown in FIG. 2 and FIGS. 4 to 6, the circle 60 is provided so as to be rotatable about the axis O below the drawbar 20 via the bearings 30. The circle 60 has a circle plate 61, an outer peripheral-side wall portion 62, and a lower-side wall portion 64.

«Circle Plate»

The circle plate 61 has an annular shape centered on the axis O when seen from a plan view and has a plate shape extending in the horizontal direction. An upper surface and a lower surface of the circle plate 61 has a planar shape along the horizontal surface. As shown in FIGS. 5 and 6, the circle plate 61 is fixed to the lower-end surface of the inner ring 32 by a fixing member (not shown) such as bolt over the peripheral direction. As a result, the circle plate 61 rotates about the axis O integrally with the inner ring 32. That is, the circle plate 61 is relatively rotatable about the axis O with respect to the drawbar plate 21 via the bearing 30. The lower surface of the circle plate 61 is positioned above the lower end of the curved rib 26 of the drawbar 20.

An inner peripheral edge portion 61a of the circle plate 61 has a circular shape centered on the axis O. The inner peripheral edge portion 61a of the circle plate 61 faces the outer peripheral surface of the curved rib 26 of the drawbar 20 from the outside in the radial direction.

A position in the radial direction of the inner peripheral edge portion 61a of the circle plate 61 is a position between the tooth tip of the inner gear 30a and the outer peripheral surface of the inner ring 32. The circle plate 61 is arranged so as to protrude outward in the radial direction from the inner peripheral edge portion 61a. The upper surface of the circle plate 61 and the lower-end surface of the outer ring 31 face at a distance from each other in the vertical direction.

As shown in FIG. 2 and FIGS. 5 to 6, the circular plate 61 is provided with the outer peripheral-side wall portion 62 described above. The outer peripheral-side wall portion 62 has a cylindrical shape centered on the axis O. The inner peripheral surface of the outer peripheral-side wall portion 62 is connected to the outer peripheral side of the circle plate 61. The outer peripheral-side wall portion 62 extends from the outer periphery of the circle plate 61 both upward and downward. The outer peripheral-side wall portion 62 surrounds the bearing 30 from the outer peripheral side thereof. The upper end of the outer peripheral-side wall portion 62 faces the lower surface of the drawbar plate 21 at a distance from the lower surface of the drawbar plate 21 in the vertical direction. That is, a clearance C which penetrates in the radial direction over the peripheral direction is formed between the upper end of the outer peripheral-side wall portion 62 and the lower surface of the drawbar plate 21.

As shown in FIGS. 2 and 4, a pair of supports 80 are fixed to the outer peripheral surface of the outer peripheral-side wall portion 62, which is an outer peripheral surface of the circle 60, at a distance from each other in the vehicle width direction. Each support 80 extends rearward along the outer peripheral surface of the circle 60, and then, extends and curves downward.

As shown in FIG. 5, a lower-side wall portion 64 is provided in the circle plate 61. The lower-side wall portion 64 protrudes downward from the lower surface of the circle plate 61 and extends in the peripheral direction. The lower-side wall portion 64 has an annular shape centered on the axis O when seen from a plan view. A position in the radial direction of the lower-side wall portion 64 is located between the inner peripheral edge portion 61a of the circle plate 61 and the outer peripheral-side wall portion 62. A position in the radial direction of the lower-side wall portion 64 is outside in the radial direction of the outer peripheral surface of the inner ring 32, and is located inside in the radial direction of the outer peripheral surface of the outer ring 31.

As shown in FIGS. 5 and 6, the inner peripheral edge portion 61a of the circle plate 61 and the end portion outside in the radial direction of the lower surface portion 52b of the gear cover 52 are disposed apart from each other in the radial direction, and a gap G1 is formed between the inner peripheral edge portion 61a and the lower surface portion 52b.

«Bottom Cover»

As shown in FIGS. 2 and 5, an outer shape of the bottom cover 70 as a whole has an annular shape centered on the axis O when seen from a plan view and the bottom cover 70 has a plate-like extending in the horizontal direction. The bottom cover 70 is segmented into a plurality of parts in the peripheral direction. Each of the segmented bottom covers 70 is structured so as to overlap with each other at the joint of the adjacent bottom covers 70. The bottom cover 70 prevents dirt or water from being directly subjected to the bearing 30, the gear cover 52, the circle rotary machine 50, and the like, on the upper surface side of the bottom cover 70. Further, the bottom cover prevents the following equipment from being damaged caused by a rock or the like being directly brought into contact with the bearing 30, the gear cover 52, the circle rotary machine 50 or the like. The upper surface and the lower surface of the bottom cover 70 has a planar shape along the horizontal surface. The bottom cover 70 is fixed to the lower ends of the curved rib 26 of the drawbar 20 and the curved rib recessed portion 26a by a bolt (not shown) over the peripheral direction. The bottom cover 70 may be fixed to the curved rib 26, the curved rib recessed portion 26a via a bracket or the like. Since the bottom cover 70 is segmented into a plurality of parts in the peripheral direction, for example, when performing maintenance of the bearing 30, only the bottom cover 70 corresponding to a predetermined portion in the peripheral direction necessary for inspection is possible to be removed, thereby the maintenance performance of the work equipment 10 improves. In addition, when a part of the bottom cover 70 is damaged, only the bottom cover 70 is necessary to be replaced, and maintenance performance including maintenance cost may be improved.

An inner circumference of the bottom cover 70 is arranged along the curved rib 26 and the curved rib recessed portion 26a. The bottom cover 70 extends so as to protrude outward in the radial direction from a fixed portion with the curved rib 26 and the curved rib recessed portion 26a. An outer peripheral edge portion 71 of the bottom cover 70 faces the inner peripheral surface of the lower-side wall portion 64 of the circle 60 from an inside in the radial direction. As a result, an opening portion G2 vertically passing through the bottom cover 70 over the peripheral direction is formed between the outer peripheral edge portion 71 of the bottom cover 70 and the inner peripheral surface of the lower-side wall portion 64. The opening portion G2 communicates with the space T1 in an inner side of the gear cover 52 through the gap G1, the space T2, and a bottom space R3 which will be described later. The lower end of the lower-side wall portion 64 of the circle 60 is located slightly lower than the lower end of the outer peripheral edge portion 71 of the bottom cover 70. That is, the lower-side wall portion 64 protrudes downward as compared with the outer peripheral edge portion 71 of the bottom cover 70.

Further, as shown in FIG. 6, a portion recessed downward (recess portion 72) is formed in the bottom cover 70 at a position below the circle rotary machine 50. The cover member 54 provided in the lower surface portion 52b of the gear cover 52 is disposed in the recess portion 72.

A space sectioned by the outer peripheral surface of the curved rib recessed portion 26a, the lower surface of the circle plate 61, the inner peripheral surface of the lower-side wall portion 64, and the upper surface of the bottom cover 70 is defined as a bottom space R3. The bottom space R3 communicates with the inner peripheral-side space R2 through the gap G1. The bottom space R3 also communicates with the opening portion G2.

«Blade»

As shown in FIG. 1, the blade 90 extends in the horizontal direction below the circle 60. The blade 90 is supported by the pair of supports 80. That is, the blade 90 is supported by the circle 60 through the supports 80. The blade 90 is relatively movable with respect to the circle 60 in an extension direction of the blade 90 by a blade shift cylinder (not shown). The drawbar 20 is swingable about an axis along the extending direction of the blade 90 by a tilt cylinder 103 shown in FIG. 1.

<Operation and Effects>

In the work equipment 10 for the motor grader 1 having the above structure, when the outer gear 50a is rotated by driving the circle rotary machine 50, the outer gear 50a engages with the inner gear 30a, so that the inner ring 32 rotates relative to the outer ring 31 about the axis O. As a result, the circle 60 fixed integrally to the inner ring 32 is rotated about the axis O, and the blade 90 fixed and supported to the circle 60 through the supports 80 is also rotated about the axis O. Thereby, by adjusting a rotation angle of the outer gear 50a provided in the circle rotary machine 50, it is possible to arbitrarily set a propulsion angle of the blade 90.

Here, in the circle rotary machine 50, the lubricant L is possible to be supplied to the space T1 inside the gear cover 52 through the supply portion 41 of the rotary machine lubricating unit 40. Therefore, it is not necessary for the operator to directly access an engaging portion between the inner gear 30a and the outer gear 50a to supply (apply) the lubricant L. Therefore, the lubricant L is possible to be easily supplied to the engaging portion between the inner gear 30a and the outer gear 50a, the maintenance performance is possible to be improved, durability is possible to be secured, and it is possible to perform a smooth rotation operation of the circle 60.

Further, the lubricant L supplied to the space T1 between the outer gear 50a and the gear cover 52 spreads over the entire periphery of the outer gear 50a in accordance with the rotation of the outer gear 50a. Thereafter, the lubricant L flows toward the space T2, and as shown in FIGS. 5 and 6, the lubricant L is discharged through the gap G1 between the inner peripheral edge portion 61a of the circle plate 61 and the lower surface portion 52b of the gear cover 52, and the opening portion G2 between the outer peripheral edge portion 71 of the bottom cover 70 and the inner peripheral surface of the lower-side wall portion 64.

The lubricant L supplied to the bearing 30 from the bearing lubricating unit 34 flows into an upper portion space R1 above the inner ring through the supply hole 31b of the outer ring 31, then flows toward the gap G1, joins with the lubricant L flowing toward the gap G1 from the space T1 inside the gear cover 52, is discharged from the opening portion G2, and flows down to the recess portion 72 of the bottom cover 70.

Therefore, while the old lubricant L is discharged from the opening portion G2, it becomes possible to supply a new lubricant L to the space T1 inside the gear cover 52, and thus it is possible to further improve the lubricating performance of the engaging portion between the inner gear 30a and the outer gear 50a. Further, since the gear cover 52 covering the outer gear 50a is provided, a direct inflow of dirt and water into the outer gear 50a is possible to be avoided, wear due to the dirt can be avoided and the lubricant L is possible to be prevented from flowing out due to the water, and the wear in the engaging portion between the outer gear 50a and the inner gear 30a can be suppressed.

A plurality of supply portions 41 for supplying the lubricant L are provided on the lateral surface portion 52a of the gear cover 52 at a distance from each other in the peripheral direction. Therefore, the lubricant L is possible to be supplied from the supply portions 41 to the space T1 in a wide range in the peripheral direction. Further, the introduction portion 42 for introducing the lubricant L into the supply portion 41 is opened above the drawbar plate 21. Therefore, for example, it is not necessary for the operator to introduce the lubricant L into the engaging portion between the inner gear 30a and the outer gear 50a by crawling under the drawbar plate 21. Therefore, according to the present embodiment, the operation of introducing the lubricant L from the introduction portion 42 becomes easy, and the maintenance performance is improved.

Although only one introduction portion 42 is provided, a plurality of supply portions 41 are connected to each other by the connection member 43. Therefore, when the lubricant L is introduced from one introduction portion 42, it is possible to supply the lubricant L to the space T1 from all of the supply portions 41. As a result, it is possible to supply the lubricant L to the space T1 very easily.

The gear cover 52 has a lower surface portion 52b, and a cover member 54 is provided in the lower surface portion 52b. Therefore, even when dirt or water flows into the bottom space R3 through the opening portion G2, it is possible to prevent the dirt from flowing into the space T1 inside the gear cover 52. As a result, it is possible to suppress the occurrence of wear due to the dirt at the engaging portion between the outer gear 50a and the inner gear 30a.

Furthermore, the circle rotary machine 50 has the flange portion 53. Part of the lower surface of the flange portion 53 is exposed downward from the through hole 21c of the drawbar plate 21, and the flange portion 53 has an exposed portion 53a. Further, the introducing portion 42 is provided in the exposed portion 53a. Therefore, it is not necessary to provide the introduction portion 42 by penetrating through the drawbar plate 21. Therefore, even when the introduction portion 42 is opened above the drawbar plate 21 as in the case of the present embodiment, it is possible to install the introduction portion 42 easily. Further, by inserting and extracting the circle rotary machine 50 from the through hole 21c of the drawbar plate 21, it becomes possible to install and remove the supply portions 41, the introducing portion 42 and the connection member 43 of the rotating machine lubricating unit 40 integrally with the circle rotary machine 50. Therefore, it is possible to improve the maintenance performance of the rotary machine lubrication unit 40.

OTHER EMBODIMENTS

Although an embodiment of the present invention has been described as above, the present invention is not limited thereto and can be appropriately changed without departing from the technical idea of the present invention.

In the embodiment, the lubricant L supplied to the space T1 by the rotary machine lubricating unit 40 and the lubricant L supplied to the bearing 30 by the bearing lubricating unit 34 may be made of other lubricant such as lubricating oil having a viscosity lower than that of grease. The lubricant L may be supplied automatically or manually by a worker, for example, by using a grease gun.

In addition, only one supply portion 41 of the rotary machine lubrication unit 40 may be provided. That is, at least one supply portion 41 needs to be provided. The introduction portion 42 of the rotary machine lubrication unit 40 may be provided so as to penetrate the drawbar plate 21 instead of providing on the flange portion 53 of the circle rotary machine 50. Further, the introduction portion 42 is not limited to be opened above the drawbar plate 21, but may be opened at a position where the lubricant L is capable of being introduced.

In the above embodiment, the gear cover 52 includes the lateral surface portion 52a and the lower surface portion 52b, but may have, for example, only the lateral surface portion 52a.

INDUSTRIAL APPLICABILITY

According to the work equipment for the motor grader of the present invention, maintenance performance and durability is possible to be secured. That is, it is possible to supply the lubricant easily to the engaging portion between the outer gear of the rotary machine and the inner gear of the circle, and it is possible to achieve smooth operation of the circle.

EXPLANATION OF REFERENCE SIGN

1: Motor Grader,
2, 3: Traveling Wheels,
4: Vehicle Body Frame,
5: Rear Frame,
6: Front Frame,
6a: Counter Weight,
7: Exterior Cover,
8: Cab,
10: Work Equipment,
20: Drawbar,
21: Drawbar Plate,
21a: Plate Front Portion,
21b: Plate Rear Portion,
21c: Through Hole,
22: Lateral Rib,
23: Vertical Rib,
26: Curved Rib,
30: Bearing,
30a: Inner Gear;
31: Outer Ring,
31a: Outer Ring Recessed Groove,
31b: Supply Hole,
32: Inner Ring,
32a: Inner Ring Recessed Groove,
33: Rolling Body,
34: Bearing Lubrication Unit,
35: Penetration Pipe;
35a: Opening Portion;
36: Connection Portion
40: Rotary Machine Lubrication Unit;
41(41a, 41b): Supply Portion;
42: Introduction Portion;
43: Connection Member,
50: Circle Rotary Machine;
50a: Outer Gear;
50a1: Upper Protruding Portion;
50a2: Lower Protruding Portion;
51: Rotary Machine Main Body;
51a: Housing;
51b: Worm;
51c: Worm Wheel;
51d: Shaft;
51c: Screw Teeth;
51f: Tooth Portion;
52: Gear Cover;
52a: Lateral Surface Portion;
52b: Lower Surface Portion;
52c: Through Hole;
52d: Supply Hole;
53: Flange Portion;
53a: Exposed Portion;
54: Cover Member;
55, 56: O-Ring;
60: Circle;
61: Circle Plate;
61a: Inner Peripheral Edge Portion;
62: Outer Peripheral-Side Wall Portion;
64: Lower-Side Wall Portion;
80: Support;
70: Bottom Cover;
71: Outer Peripheral Edge Portion;

72: Recess Portion;
90: Blade;
A1: Front Portion Region;
A2: Rear Portion Region;
A3: Side Portion Region;
O: Axis;
O1: Axis;
101: Lift Cylinder;
102: Drawbar Shift Cylinder,
S1: Outer Peripheral-Side space;
R1: Upper Portion Space;
R2: Inner Peripheral-side Space;
R3: Bottom Space;
T1: Space;
T2: Space;
C: Clearance;
G1: Gap;
G2: Opening Portion;

The invention claimed is:

1. A work equipment for a motor grader comprising:
 a drawbar having a drawbar plate extending along a horizontal surface;
 a bearing having an outer ring that has an annular shape when seen from a plan view and is fixed to a lower surface of the drawbar plate, and an inner ring that has an annular shape when seen from a plan view, is disposed inside the outer ring, is connected to the outer ring so as to be rotatable in a peripheral direction with respect to the outer ring, and is provided with an inner gear in an inner peripheral surface of the inner ring;
 a circle rotary machine having a rotary machine main body that is provided with an outer gear engaging with the inner gear and that is configured to rotate the outer gear, and a gear cover that is provided on the rotary machine main body and covers the outer gear from the outer peripheral side of the outer gear, forms a space between the outer gear and the gear cover, and is fixed to the drawbar plate;
 a rotary machine lubrication unit provided on the gear cover and configured to supply a lubricant to the space; and
 a circle fixed to a lower end of the inner ring over the peripheral direction and communicating with the space to form an opening portion below the space,
 wherein the gear cover comprises:
  a lateral surface portion covering a part of the outer gear from the outer peripheral side of the outer gear other than a position in the outer gear where the outer gear and the inner gear are engaged with each other; and
  a lower surface portion integrally provided at a lower end of the lateral surface portion, covering the outer gear from below, and forming a gap communicating the space with the opening portion between the circle and the lower surface;
 wherein the rotary machine lubrication unit has at least one supply portion provided in a supply hole penetrating through the lateral surface portion of the gear cover in a radial direction of the outer gear and opened toward the space.

2. The work equipment for a motor grader according to claim 1,
 wherein the rotary machine lubrication unit is connected to the supply portion, opens above the drawbar plate, and further includes an introduction portion capable of introducing the lubricant to the supply portion.

3. The work equipment for a motor grader according to claim 2,
 wherein a through hole penetrating vertically the drawbar plate is formed in the drawbar plate,
 the circle rotary machine further comprises a flange portion that protrudes from the gear cover, is fixed on an upper surface of the drawbar plate in a state in which the circle rotary machine is inserted into the through hole, and includes an exposed portion exposed downward from the through hole, and
 the introducing portion in the rotary machine lubrication unit is provided in the flange portion so as to penetrate vertically the exposed portion, and opens to an upper surface of the flange portion.

* * * * *